US006993497B2

(12) United States Patent
Yeh et al.

(10) Patent No.: US 6,993,497 B2
(45) Date of Patent: Jan. 31, 2006

(54) INTEGRATED, INTERACTIVE TELEPHONE AND COMPUTER NETWORK COMMUNICATIONS SYSTEM

(75) Inventors: Yu Sung (Eduardo) Yeh, New York, NY (US); Darryl Shepherd, New York, NY (US)

(73) Assignee: Net2Phone, Inc., Newark, NJ (US)

(*) Notice: Subject to any disclaimer, the term of this patent is extended or adjusted under 35 U.S.C. 154(b) by 402 days.

(21) Appl. No.: 09/207,954

(22) Filed: Dec. 9, 1998

(65) Prior Publication Data

US 2004/0162747 A1 Aug. 19, 2004

(51) Int. Cl.
*G06F 17/60* (2006.01)

(52) U.S. Cl. ........................... 705/14; 705/10; 705/14; 379/202.01; 379/203.01; 379/204.01; 379/205.01; 455/414.01; 455/416; 455/417

(58) Field of Classification Search ................. 705/10, 705/14; 379/88.2, 210, 455, 417; 455/461
See application file for complete search history.

(56) References Cited

U.S. PATENT DOCUMENTS 5,317,626 A 5/1994 Jaynes et al. ................. 379/67
5,857,189 A * 1/1999 Riddle ......................... 707/10
5,933,778 A * 8/1999 Buhrmann et al. ......... 455/461
5,974,398 A * 10/1999 Hanson et al. ................ 705/14
6,076,068 A * 6/2000 DeLapa et al. ............... 705/14

FOREIGN PATENT DOCUMENTS

EP 0732835 9/1986
EP 0732 835 A * 9/1996

OTHER PUBLICATIONS

Camille Mendler, Competition drives toward retail innovation, Communicationsweek International, n 160, pp. 32+.*

* cited by examiner

*Primary Examiner*—Raquel Alvarez
(74) *Attorney, Agent, or Firm*—Davidson Berquist; Jackson & Gowdey, LLP

(57) ABSTRACT

A method comprising the steps of: receiving via internet a time, a date and a telephone number for a reminder telephone call (such as a wakeup call); storing in a database the time, date and telephone number of the reminder telephone call; and delivering to the subscriber via telephone the reminder telephone call at the specified time, date and telephone number. In one embodiment, the reminder call comprises a marketing message. In another embodiment, the method further comprises the steps of: receiving via the internet demographic information corresponding to the subscriber; matching the marketing message to the demographic information; and delivering the matched marketing message to the subscriber during the reminder telephone call. In other embodiments, the method further comprises the steps of receiving via the internet a personal reminder message or a selection for information, and delivering the personal reminder message or selected information to the subscriber during the reminder telephone call.

5 Claims, 9 Drawing Sheets

16
INTERNET
19
ROUTER
20
26
38
A/R DISPLAY DEVICE
40
INTERNET INTERFACE
24
PROCESSOR
ADV. RECORD GENERATOR
22
30
28
31
32
AUTO SPEECH RECOGNITION MODULE
34
TEXT-TO-SPEECH CONVERSION MODULE
SQL DB INTERFACE
PSTN INTERFACE
TELEPHONE CONFERENCE MODULE
36
PSTN
18

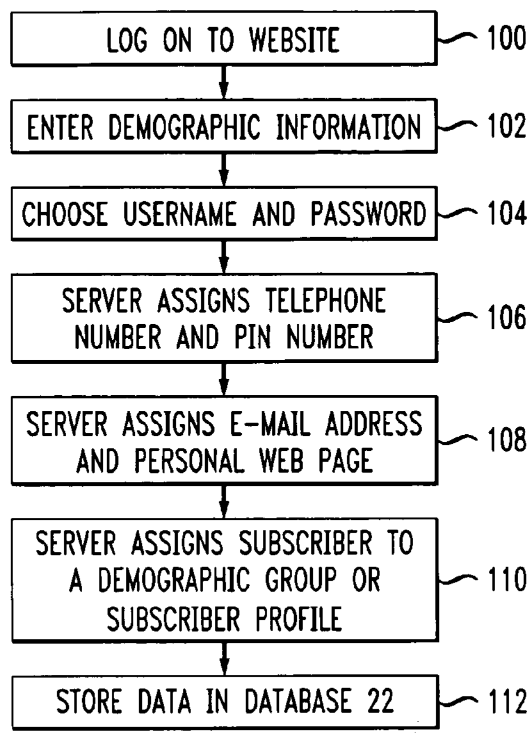
FIG. 3
LOG ON TO WEBSITE
100
ENTER DEMOGRAPHIC INFORMATION
102
CHOOSE USERNAME AND PASSWORD
104
SERVER ASSIGNS TELEPHONE NUMBER AND PIN NUMBER
106
SERVER ASSIGNS E-MAIL ADDRESS AND PERSONAL WEB PAGE
108
SERVER ASSIGNS SUBSCRIBER TO A DEMOGRAPHIC GROUP OR SUBSCRIBER PROFILE
110
STORE DATA IN DATABASE 22
112

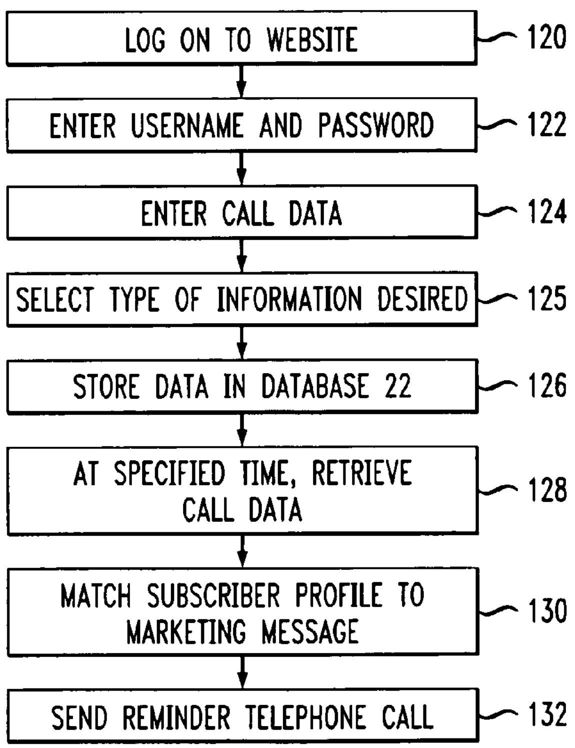
FIG. 4
LOG ON TO WEBSITE
120
ENTER USERNAME AND PASSWORD
122
ENTER CALL DATA
124
SELECT TYPE OF INFORMATION DESIRED
125
STORE DATA IN DATABASE 22
126
AT SPECIFIED TIME, RETRIEVE CALL DATA
128
MATCH SUBSCRIBER PROFILE TO MARKETING MESSAGE
130
SEND REMINDER TELEPHONE CALL
132

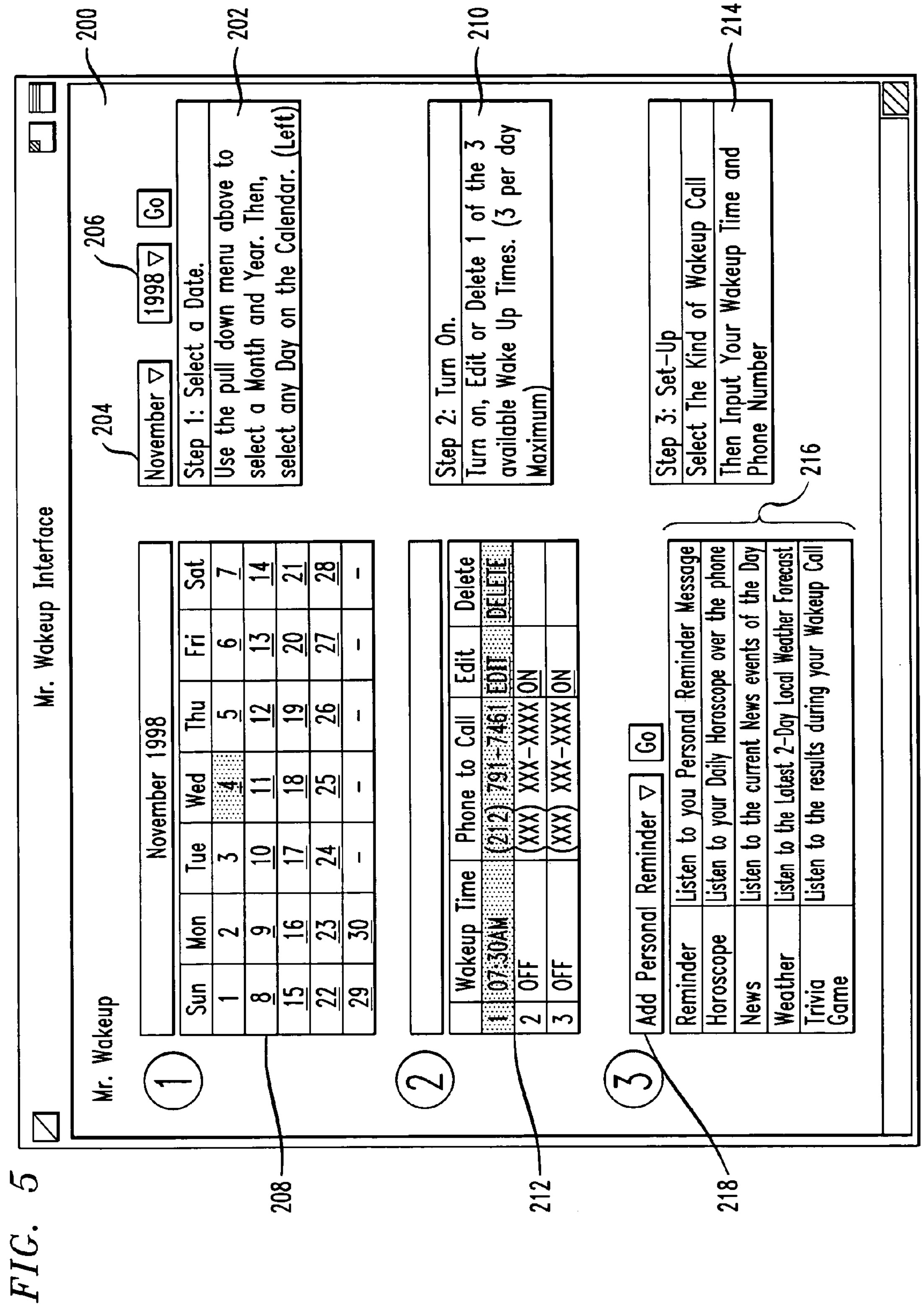
FIG. 5
Mr. Wakeup Interface
Mr. Wakeup
200
202
204
206
208
210
212
214
216
218
1
November ▽
1998 ▽
Go
November 1998
Sun Mon Tue Wed Thu Fri Sat
1 2 3 4 5 6 7
8 9 10 11 12 13 14
15 16 17 18 19 20 21
22 23 24 25 26 27 28
29 30 - - - - -
Step 1: Select a Date.
Use the pull down menu above to select a Month and Year. Then, select any Day on the Calendar. (Left)
2
Wakeup Time | Phone to Call | Edit | Delete
1 07:30AM (212) 791-7461 EDIT DELETE
2 OFF (XXX) XXX-XXXX ON
3 OFF (XXX) XXX-XXXX ON
Step 2: Turn On.
Turn on, Edit or Delete 1 of the 3 available Wake Up Times. (3 per day Maximum)
3
Add Personal Reminder ▽
Go
Reminder | Listen to you Personal Reminder Message
Horoscope | Listen to your Daily Horoscope over the phone
News | Listen to the current News events of the Day
Weather | Listen to the Latest 2-Day Local Weather Forecast
Trivia Game | Listen to the results during your Wakeup Call
Step 3: Set-Up
Select The Kind of Wakeup Call
Then Input Your Wakeup Time and Phone Number

INTEGRATED, INTERACTIVE TELEPHONE AND COMPUTER NETWORK COMMUNICATIONS SYSTEM

FIELD OF THE INVENTION

This invention relates to a communication system, and more specifically to an integrated, interactive telephone and computer network communications system that, according to one embodiment, provides a marketing message to a user.

BACKGROUND OF THE INVENTION

Enormous expenditures are made via traditional media, such as television, radio and newspapers/magazines, in order to provide consumers with marketing messages. According to some reports, in 1995, TV and cable generated approximately $44.5 billion in advertising revenue, while radio generated $14 billion and newspapers/magazines generated $51.5 billion. Direct Marketing, which also counts Telemarketing, totaled just over $150 billion in 1997, making it far and away the largest segment of the advertising world. By comparison, advertising on the Internet generated only $0.9 billion.

However, the Internet has enjoyed, and continues to enjoy, unprecedented growth. It is estimated that, within 5 years, over 150 million people will have access to and use the Internet. Therefore, it is likely that the Internet will dramatically increase its share of advertising revenues in the near future.

The traditional advertising philosophy is to provide marketing messages that will be viewed and heard by as many people as possible who might be interested in the content of the marketing message. For instance, an advertisement for a brand of young men's clothing may be placed in a magazine, which is typically sold to young men. In this manner, the owner of the brand of clothing hopes that the advertisement is seen by people who are likely to be interested in the product advertised. Unfortunately, even people in the same demographic group (e.g.—young men) have widely different interests. Thus, only a small portion of the readers of the magazine are likely to be interested in the advertisement, and the owner of the brand has not received the full benefit of the advertising expenditure.

Thus, there is a need for a system that enables a customized marketing message to be provided to an Internet user.

SUMMARY OF THE INVENTION

The present invention, in accordance with one embodiment, provides a method comprising the steps of receiving via internet a time, a date and a telephone number for a reminder telephone call; storing in a database the time, date and telephone number of the reminder telephone call; and delivering to the subscriber via telephone the reminder telephone call at the specified time, date and telephone number. In accordance with one embodiment of the invention, the reminder telephone call further comprises a marketing message. In accordance with another embodiment, the method further comprises the steps of receiving via the internet demographic information corresponding to the subscriber; matching the marketing message to the demographic information; and delivering the matched marketing message to the subscriber during the reminder telephone call. In accordance with other embodiments, the method further comprises the steps of receiving via the Internet a personal reminder message or a selection for information, and delivering the personal reminder message or the selected information to the subscriber during the reminder telephone call.

In accordance with another embodiment, the present invention provides a method for delivering a marketing message comprising the steps of: receiving via internet demographic information corresponding to a subscriber; assigning to the subscriber a storage space that is configured to store a personal message to the subscriber; and delivering to the subscriber a marketing message corresponding to the demographic information when the subscriber accesses the personal messages.

In another embodiment, the present invention provides a method for a communications server to deliver a marketing message comprising the steps of: receiving a telephone call from a caller at the server; querying the caller for a third-party telephone number; receiving the third-party telephone number; initiating a telephone conference call between the caller and a third-party at the third-party telephone number; and delivering to the caller and the third-party a marketing message during the telephone conference call.

In another embodiment, the present invention provides a method for a communications server to deliver a marketing message comprising the steps of: receiving a telephone call from a caller having a calling card having a predetermined number of minute credits associated with it; querying the caller for a third-party telephone number; receiving the third-party telephone number; initiating a telephone call between the caller and a third-party at the third-party telephone number; delivering to the caller and the third-party a marketing message during the telephone call.

In another embodiment, the present invention provides a method comprising the steps of: receiving via internet a telephone number and an e-mail address corresponding to a subscriber; receiving the e-mail message at the e-mail address; and delivering to the subscriber via telephone an e-mail reminder telephone call at the subscriber telephone number, so as to inform the subscriber of the receipt of the e-mail message. According to other embodiments, the e-mail reminder telephone call comprises a marketing message corresponding to demographic information received from the subscriber.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

FIG. 3 is a flow chart that illustrates the steps performed during subscription, in accordance with one embodiment of the invention;

FIG. 4 is a flow chart that illustrates, according to one embodiment, the steps performed in order to generate reminder telephone calls;

FIG. 5 illustrates one example of a website user-interface, in accordance with one embodiment of the present invention;

FIG. 6(*b*) is a flow chart that illustrates a "bookmarking" function, in accordance with one embodiment of the present invention;

FIG. 6(*c*) is a flow chart that illustrates a message retrieval feature, in accordance with one embodiment of the present invention;

DETAILED DESCRIPTION OF THE INVENTION

Figure 1:
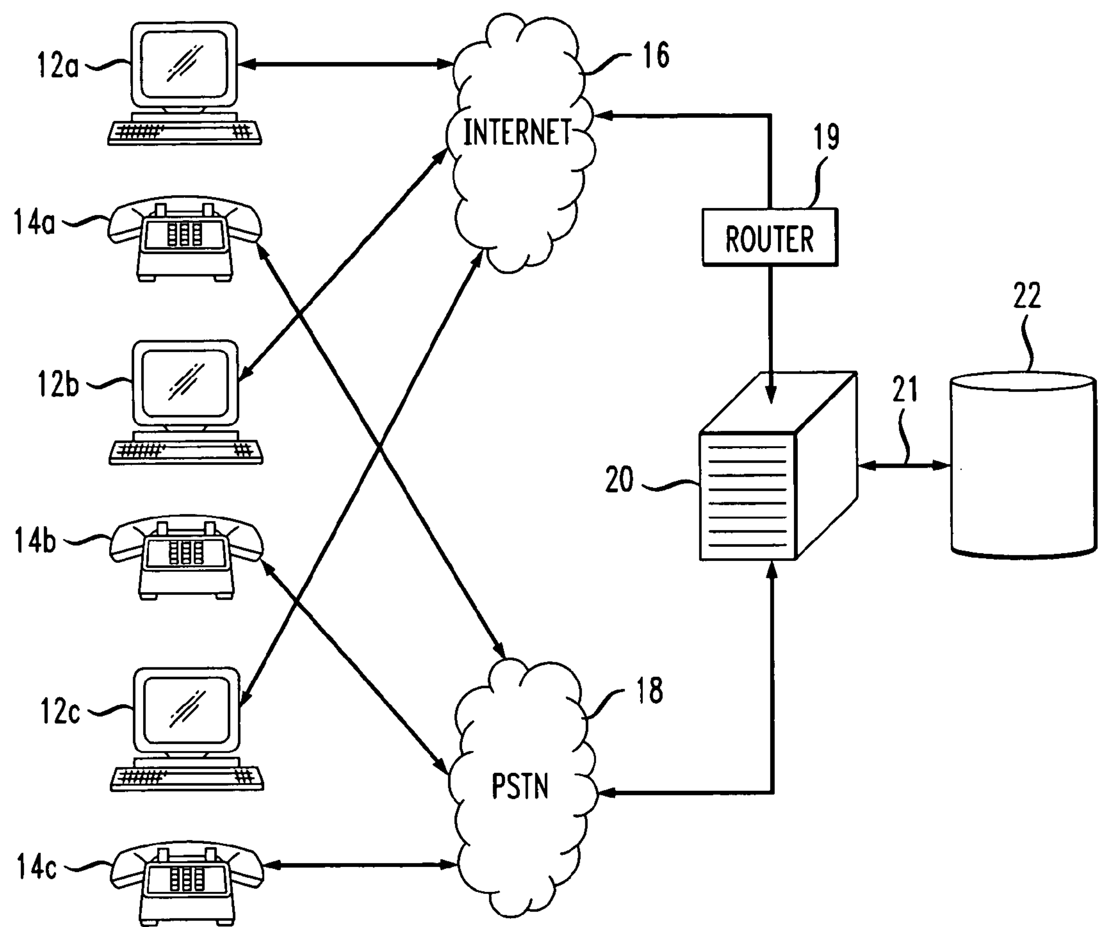
FIG. 1 illustrates a communications system, in accordance with one embodiment of the invention.

FIG. 1 illustrates a communications system, in accordance with one embodiment of the present invention. In the embodiment shown, computer terminals 12*a*, 12*b* and 12*c* are coupled to Internet 16, which in turn is coupled to server 20 via data router 19. Server 20 is configured to maintain an addressable web site that provides one interface for users of the computer terminals to communicate with server 20, as will be described further below. Server 20 is also coupled to database 22, and data is transferred from server 20 to database 22, and vice versa, via interface 21. Database 22 is configured to store data, including electronic and voice messages and to automatically respond to multiple queries based on collected information regarding, for instance, subscribers and marketing messages.

Additionally, server 20 is coupled to telephones 14*a*, 14*b* and 14*c* via public-switched telephone network 18, providing another interface, advantageously a toll-free number, for subscribers of the system to communicate with server 20, or a specifiable telephone number for users to leave messages for a subscriber, as described below. It should be noted, however, that the system of the present invention may employ cellular telephones, in which case server 20 would communicate with telephones 14*a*, 14*b* and 14*c* via wireless communication channels. The present invention is not intended to be limited in scope by the means by which server 20 communicates with the telephones.

In another embodiment, internet 16 and public-switched telephone network 18 are coupled to a telecommunication central office, which in turn is coupled to a data/voice converged router. The data/voice router is coupled to server 20. Regardless, the present invention is configured so that server 20 communicates with internet 16 and public-switched telephone network 18.

Figure 2:
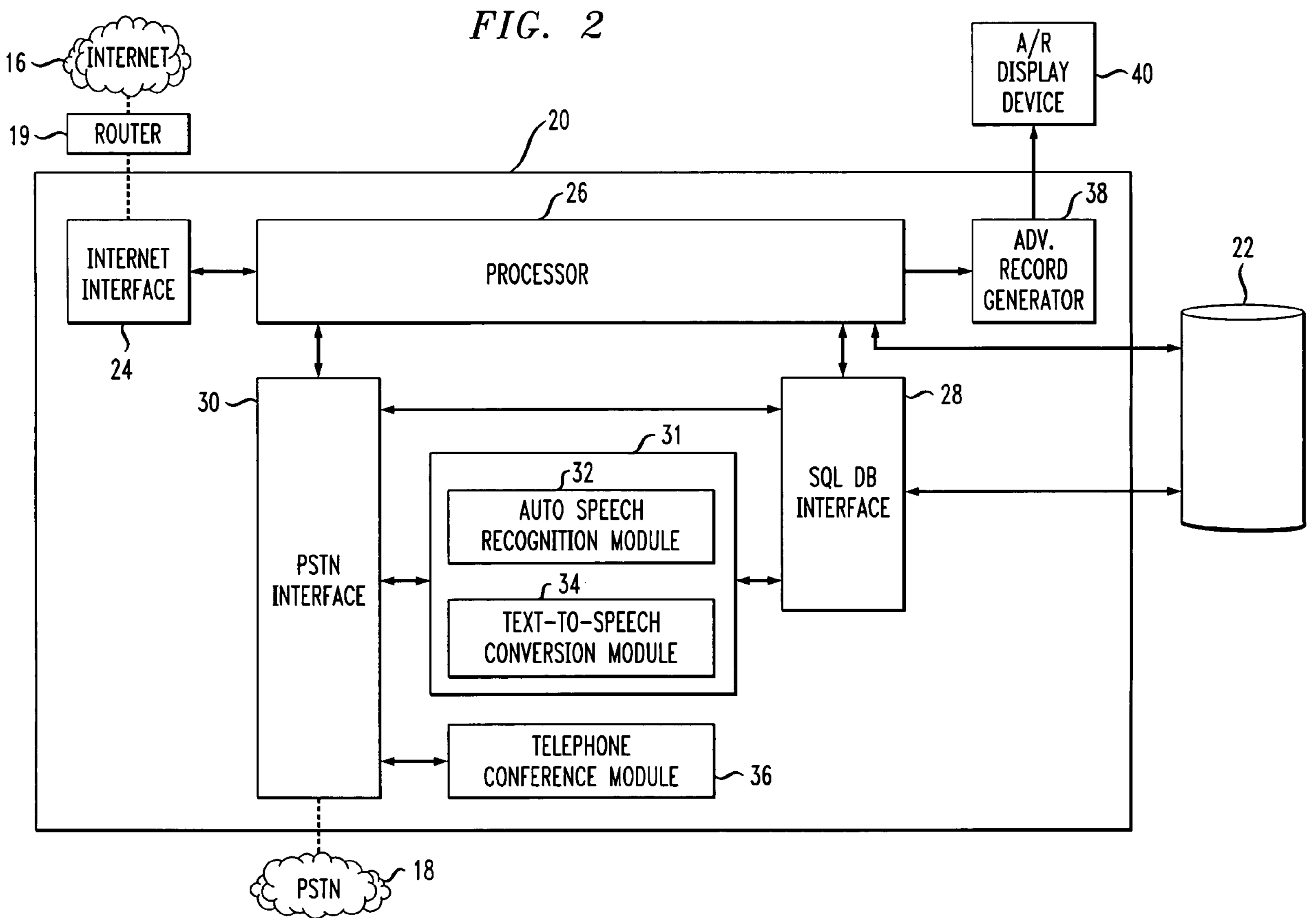
FIG. 2 is a diagram that illustrates the various components of server 20, in accordance with one embodiment of the invention.

FIG. 2 is a diagram that illustrates the various components of server 20, in accordance with one embodiment of the present invention. Internet interface 24 allows data transfer operations between server 20 and Internet 16, so as to enable users or potential subscribers to communicate with server 20. An example of a website which may be utilized for this purpose, and the features that exist in various embodiments of the invention, is shown and discussed in connection with FIG. 5, which is explained below. Internet interface 24 is coupled to processor 26, which, among other things, performs the functions selected by the internet user. Additionally, internet interface 24 is configured to communicate with internet 16 via data router 19, as shown in FIG. 1.

Processor 26 is coupled to SQL database interface 28, so as to control data transfer operations between server 20 and database 22. Processor 26 is also coupled directly to database 22 and is configured to communicate directly with database 22. Additionally, processor 26 is coupled to advertising record generator 38, which is further coupled to advertising record display device 40. Typically, advertising record display device 40 is a printer or a computer screen.

Also, processor 26 is coupled to public-switched telephone network interface (hereinafter "PSTN interface") 30. PSTN interface 30, which is a telephony interface such as Dialogic's D240SC-2T1 or D480SC-2T1 boards, is configured to communicate with PSTN 18, as shown in FIG. 1. According to one embodiment of the invention, interactive voice response functions are processed by PSTN interface 30. In this embodiment, PSTN interface 30 is configured to interact with users by recognizing received voiced commands and to respond with voiced responses, or to respond to a user pressing a button on the user's telephone, as will be explained below.

PSTN interface 30 is coupled to module 31, which comprises automated speech recognition module 32 and text-to-speech conversion module 34. Module 32 is configured to convert speech messages received via PSTN interface 30 into text messages and/or into digitized sound file format (such as those provided under "wav" format), which can be transmitted to SQL database interface 28. Text-to-speech conversion module 34 is configured to receive text messages from SQL database interface 28 and to convert them into speech messages that are transmitted to a user via PSTN interface 30. Module 31 is coupled to SQL database interface 28. Also, PSTN interface 30 is coupled directly to SQL database interface 28, and to telephone conference module 36, which will be explained more fully below.

The present invention, in accordance with one embodiment, generates marketing messages that are customized to the person who is receiving them, and delivers them to the person via telephone and Internet. In order to enable the system of the present invention to customize the marketing messages, a user advantageously subscribes to the system via internet interface 24. FIG. 3 is a flow chart that illustrates the steps performed during subscription, in accordance with one embodiment of the invention.

As shown in FIG. 3, at step 100, a person logs on to an addressable web site corresponding to server 20. At step 102, server 20 queries for and receives demographic information inputted by the user. Examples of this demographic information may be the subscriber's name, address, telephone number, age, sex, personal interests, etc.

At step 104, the subscriber chooses a username and a password. The username identifies the subscriber to the system, while the password is a security measure that insures that only the subscriber has access to his or her messages. As will be explained more fully below, the subscriber inputs his or her password when the subscriber desires to retrieve messages that have been previously left for the subscriber.

At step 106, server 20 assigns to the subscriber a Personal ID Number (referred to hereinafter as "a PIN number") and a telephone number. The use of a PIN number is well known in the art, and generally is a number comprising several digits which differentiates the subscriber from other users of the system. This PIN number corresponds to a storage space in database 22. A person can call the subscriber to leave a message by dialing the assigned telephone number and inputting the subscriber's unique PIN Number.

At step 108, server 20 assigns to the subscriber an e-mail address and a personalized web page. The assigned e-mail address also corresponds to a storage space in database 22. Thus, a person who desires to leave the subscriber an electronic message via the internet can do so, and the message will be stored in the corresponding storage space in database 22 until retrieved by the subscriber. In accordance with one embodiment of the invention, the storage space in database 22 for both the voice and e-mail messages are limited to a certain number of messages or a certain number of data storage bits.

Advantageously, the e-mail address assigned by server 20 for users to leave an electronic message for a subscriber is identical to the PIN number assigned by server 20 for users to leave a voice message by telephone for the same subscriber, with the addition of the suffix "@domain.com". Thus, the subscriber can apprise other persons of a single number where they can leave messages to be received by the subscriber, either by telephone or by e-mail.

As will be explained later, the personalized web page that is assigned to the subscriber is a web page that is hyperlinked to the web site corresponding to server 20, as already discussed. Advantageously, the personalized web page can only be accessed by the subscriber, and contains a list of previously received messages, hyper-text links to other web sites that the subscriber is interested in, etc. Additional features will be discussed in greater detail below.

At step 110, server 20 assigns to the new subscriber a corresponding demographic group or subscriber profile. The subscriber profile, advantageously, is based upon the demographic data that was inputted by the subscriber at step 102. For instance, the subscriber may be matched to a profile corresponding to a male aged 20–29 who lives in the New York City area and is interested in rock music. As will be discussed below, this subscriber profile is employed, according to one embodiment of the invention, in order to select which marketing messages should be provided to the subscriber.

At step 112, the data is stored in database 22. For instance, database 22 is configured to store the subscriber's demographic information and the subscriber profile that the subscriber fits in, as well as the telephone number, e-mail address, username, password, PIN number, etc. associated with the subscriber.

As previously mentioned, the present invention, in accordance with one embodiment, employs various means of delivering to a person a customized marketing message. One method employed by the present invention is referred to as "Mr. WakeUp™". This embodiment of the present invention generates wake-up or reminder telephone calls to a person at times specified by the subscriber on Mr. WakeUp™'s world wide web page. FIG. 4 is a flow chart that illustrates, according to one embodiment, the steps performed in order to generate reminder and wake-up telephone calls.

At step 120, a subscriber (who has already subscribed by performing the steps of FIG. 3) logs on to the addressable website corresponding to server 20, as previously described. At step 122, the subscriber enters his or her username and password. By entering the username and password, the system of the present invention can access the demographic data that was previously entered by the subscriber, as at step 102 of FIG. 3. This data is stored in database 22 and, as previously described, is utilized to customize marketing messages to be received by subscribers. Additionally, by entering his or her username and password, the subscriber is directed to his or her personal webpage, as was previously described in step 108 of FIG. 3. Once on the personal webpage, the subscriber selects the wake-up/reminder call function of the system, preferably by clicking a hypertext link that directs the subscriber to a user-interface like the one shown in FIG. 5.

At step 124, the subscriber enters call data, which may comprise a date, time and a telephone number at which the subscriber desires to receive a telephone call. FIG. 5, the features of which will be described in greater detail below, is an example of the Mr. WakeUp™ interface, generated by Internet interface 24 of server 20. Generally, the interface queries the subscriber for a date, time and telephone number at which the subscriber would like to receive a wake-up and/or reminder phone call.

At step 125, the subscriber selects the type of phone call or the type of information that the subscriber wants to receive with his or her wakeup or reminder phone calls. This step is discussed in greater detail in connection with field 216 of FIG. 5.

Advantageously, in accordance with one embodiment of the present invention, the subscriber can also select a text reminder message that the subscriber has inputted. The reminder message may relate to anything that concerns the subscriber, e.g.—a reminder to wake up, make a call, run an errand, etc. The present invention is not limited in scope by the content or purpose of the reminder message.

At step 126, server 20 transmits the data that has been inputted by the subscriber to database 22 for storage, preferably via processor 26 and SQL database interface 28. At step 128, on the date and at the time specified by the subscriber in 124, server 20 retrieves the call data to be utilized.

At step 130, the demographic information or subscriber profile that corresponds to the subscriber is matched to a particular marketing message. As previously discussed, the subscriber profile, advantageously, is based upon the demographic data that was inputted by the subscriber at step 102 of FIG. 3. For instance, the subscriber may be matched to a profile, based on the demographic information inputted, corresponding to a male aged 20–29 who lives in the New York City area and is interested in rock music. The marketing message, which is matched, is one that has been predetermined to have a great likelihood of appealing to the subscriber. For instance, for the demographic information described above, a marketing message related to clothing typically worn by males aged 20–29 might be matched to the subscriber profile. Alternatively, a marketing message related to activities in or around New York City would be matched, or a marketing message related to a musical group would be matched. The present invention is not limited in scope by the type of marketing message employed.

At step 132, on the date and at the time specified by the subscriber during step 124, server 20 generates a telephone call to the subscriber at the telephone number specified by the subscriber at step 124. The marketing message that is matched to the subscriber profile corresponding to the subscriber is sent, along with the selected type of information on step 125, to the subscriber during the telephone call. In this manner, the subscriber receives a marketing message that is very likely to correspond to the subscriber's actual preferences and interests, since the marketing message is automatically selected by server 20 based upon information that the subscriber has provided.

According to one embodiment of the invention, when the system is busy at the time when a reminder call is to be delivered, server 20 is configured to generate the reminder telephone call before or after the originally scheduled delivery time. For instance, in one embodiment, if a subscriber requests that a reminder telephone call be delivered at 6:00 a.m. and server 20 is scheduled to make other calls at that time, server 20 is configured to automatically deliver the call during a range of time between, for example, 5:55 a.m. and 6:05 a.m. In another embodiment, the subscriber selects a range during which the call will be delivered, or else the subscriber supplies server 20 with second or third choices for the time of the call. Regardless, if the system is unable to deliver the call at the specified time, server 20 delivers the call at an acceptable, alternative time.

According to one embodiment of the invention, the text reminder that is inputted by the subscriber at step 125 is received by Internet interface 24 and is communicated to processor 26. Processor 26 sends text data via SQL database interface 28 for storage until required, at which point the text data is retrieved by processor 26 and is communicated to module 34 for the text-to-speech conversion. Conversion module 34 converts the digitally stored text messages, such as the personal reminder message (which is explained below) that was inputted by the subscriber, into voice messages. The voice message can then be transmitted to the subscriber via PSTN interface 30 when the reminder telephone call is delivered.

FIG. 5 illustrates one example of a web site user-interface 200 as provided to a user by server 20. User interface 200 shows some of the features that may be employed by the system of the present invention according to various embodiments. Instruction box 202 contains a first set of instructions to the user. In the embodiment shown, the instructions indicate how the user selects a date on which the user desires to receive the wakeup or reminder telephone call. Pulldown menu 204 comprises a list of months which the user can select. Similarly, pulldown menu 206 comprises a list of years, which the user can select. Once the user has selected both a month and year, a calendar 208 corresponding to the month and year selected is shown. The user can then select any day of that month for receiving a call.

Instruction box 210 contains a second set of instructions to the user. According to this embodiment, instruction box 210 instructs the user in the use of data entry fields, collectively shown as entry data 212. For instance, fields 212 contains spaces for the user to indicate a time of day, and a telephone number at which the subscriber desires to receive the reminder calls. Additional fields permit the user to ascertain and adjust the status of the desired call, such as by deleting a previously entered call, or by activating the call "ON" so as to receive it as originally entered.

Instruction box 214 contains a third set of instructions to the user, in this embodiment instructing the user to select a type of call desired. Selection fields 216 comprise various types of messages or information that may be received by the subscriber during the telephone call. For instance, the user can select a "Horoscope" field in order to listen to daily horoscopes, a "News" field in order to listen to current news events of the day, a "Weather" field in order to listen to local weather forecasts, etc.

Additionally, the subscriber can select a "Reminder" field, which permits the subscriber to receive during the reminder call a personal reminder message. As previously indicated, the personal reminder message can relate to an errand to be performed by the subscriber, a task to perform, or an infinite number of other personal messages. The personal reminder message can be inputted by the subscriber by clicking on field 218, which advantageously provides the subscriber with a space for typing the message. The message can then be stored in database 22 along with the other call data for delivery to the subscriber when desired.

The types of calls that can be selected by the subscriber are numerous. For instance, the subscriber may also be given the options of selecting for delivery during the telephone call stock prices, sports scores, trivia questions and answers, winning lottery numbers, traffic reports, etc. The present invention is not intended to be limited in scope by the contents of the call to be received.

FIG. 5 shows only some of the features that may be employed in the present invention. According to one embodiment, the user can also select via server 20 how the reminder telephone call is delivered. For instance, the call may be delivered in a business-like manner if the subscriber is a business executive or other professional, or it may be delivered in a comedic manner if the subscriber desires to receive an upbeat or funny reminder telephone call. In accordance with another embodiment of the invention, the subscriber can select to receive the desired information from various different people, such as by a celebrity, a favorite DJ, or a significant other.

In accordance with another embodiment of the invention, users can enjoy other types of practical and intriguing content. For instance, time management tips can be provided, or facts relating to personal or professional interests can be provided.

Figure 6A:
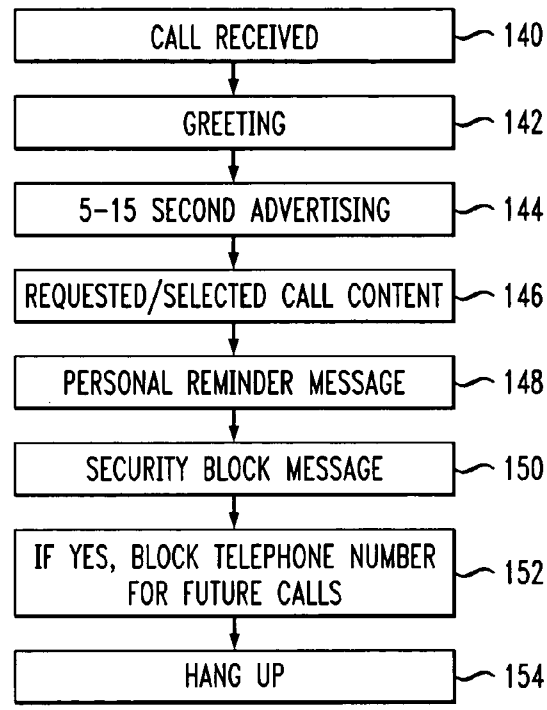
FIG. 6(*a*) is a flow chart that illustrates a typical reminder call generated by the server, in accordance with one embodiment of the present invention.
Figure 6B:
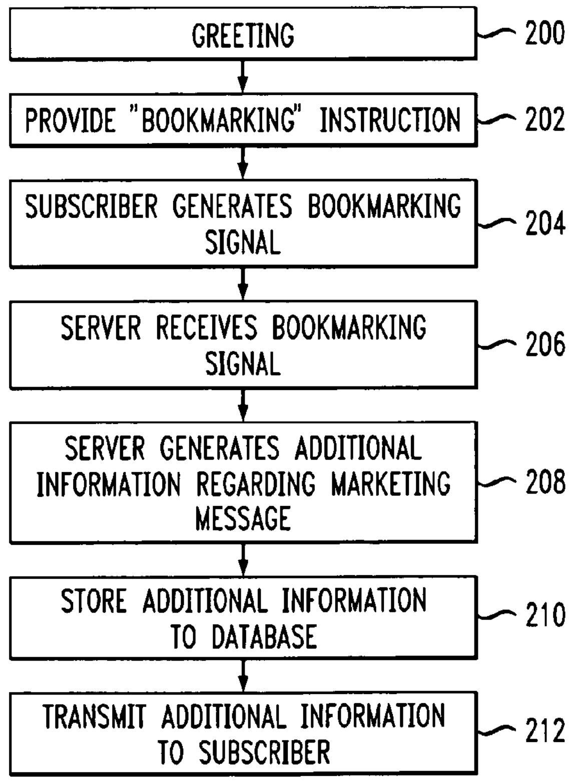
Figure 6C:
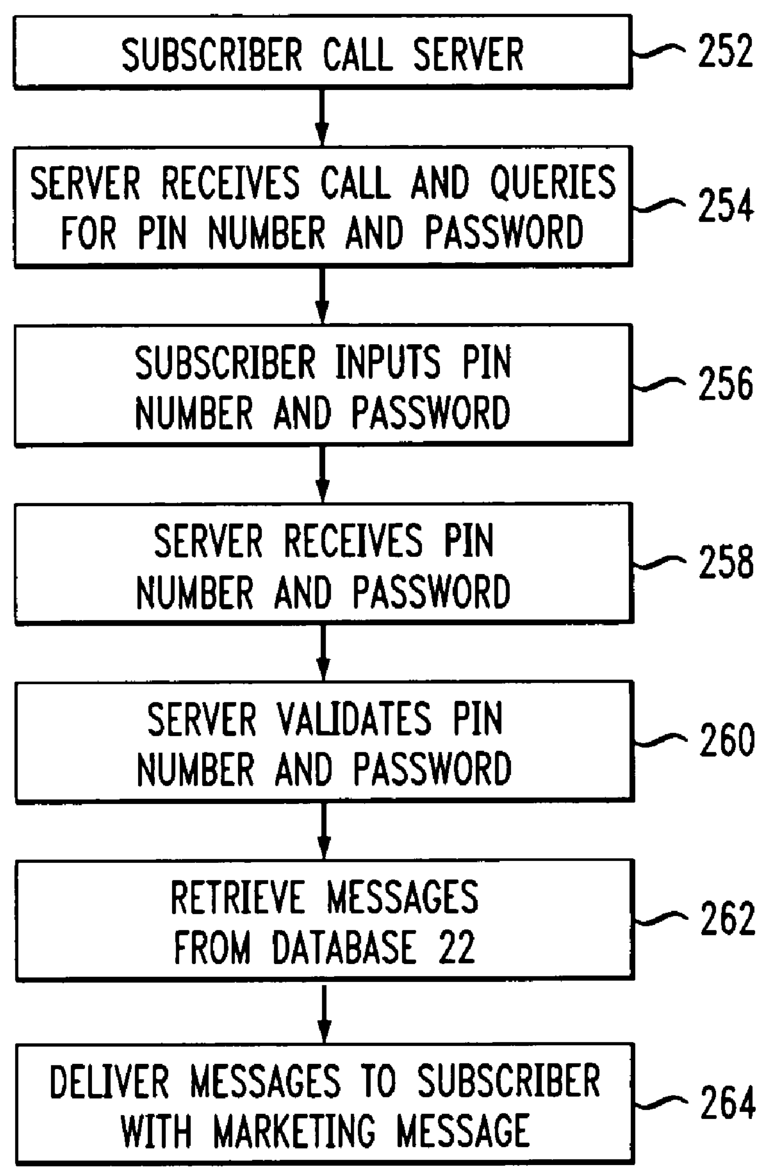

FIG. 6(*a*) is a flow chart that illustrates, in accordance with one embodiment of the present invention, a typical reminder or wakeup call generated by server 20. At step 140, the reminder telephone call is received by the subscriber, although it is noted that the subscriber of the present invention may direct that a telephone call be made to a recipient other than the subscriber.

At step 142, a greeting is provided to the subscriber, such as "Good Morning" or "Welcome to Mr. Wakeup™". According to one embodiment, the greeting is stored in database 22 and is transmitted to server 20 to be provided to the subscriber.

At step 144, the marketing message matched to the subscriber's profile is provided to the subscriber. Advantageously, the marketing message is about 5 to 15 seconds in length. As previously explained, in one embodiment the marketing message is stored as text in database 22 and is converted to a voice message by text-to speech conversion module 34 of server 20 at the desired time for delivery to the subscriber via PSTN interface 30. In another embodiment, the marketing message is a recorded audio file that is stored in database 22. In this embodiment, the message is delivered to the subscriber via PSTN interface 30 without needing to be converted by text-to-speech conversion module 34. Regardless, the marketing message is matched to the subscriber's profile based upon the demographic information inputted by the subscriber at step 102 of the flow chart in FIG. 3, thus insuring a high likelihood of interest by the subscriber. The matching of the marketing message to the subscriber's profile is performed as previously described in step 130 of FIG. 4.

At step 146, the system provides the subscriber with the information requested by the subscriber when setting up the call. For instance, if the subscriber selected field 216 entitled "News" of FIG. 5, then the subscriber would receive at this point of the reminder telephone call the current news update. Advantageously, the news which the subscriber receives, or any other information which is selected by the subscriber, is either stored and periodically updated in database 22 prior to transmission to the subscriber, or else is retrieved at the time of the telephone call from a separate source, such as a news or weather channel, or stock watch. According to one embodiment, the recipient of the call is required to press a button on the telephone in order for the system to perform step 146.

By providing this information at step 146, the subscriber is more likely to finish listening to the marketing message, rather than hanging up, even if there is no personal reminder message to be received (as described in step 148). Also, in one embodiment, the system states the time and date at this step as an additional service to the subscriber.

At step 148, the personal reminder message that was inputted by the subscriber at step 124 of the flow chart in FIG. 4 is provided to the subscriber. As previously explained, the personal reminder message is advantageously stored as text in database 32 and is converted to a voice message by text-to speech conversion module 34 of server 20 at the desired time for delivery to the subscriber via PSTN interface 30.

At step 150, in accordance with one embodiment of the invention, the system employs a security measure. Specifically, the system inquires whether the person who receives the call desires to block the telephone number from receiving reminder calls in the future. This feature of the invention advantageously prevents a subscriber from sending telephone calls to another person who does not desire to receive it. If the recipient of the call does not desire to receive future calls from this system, the recipient presses a button on his or her telephone (e.g.—the "9" or the "#" key), which transmits a signal received by server 20. Server 20 sends a corresponding signal to database 22 that, at step 152, block database 22 from delivering a reminder call to the telephone number in the future. According to another embodiment, a blocked telephone number owner can be re-activated by the owner of the number by communicating to the operator of the system of the present invention to remove the blocking signal.

In accordance with another embodiment, when the recipient of the reminder call presses a button on the telephone, the telephone number is stored in a storage space in database 22. The system then checks each inputted telephone number to determine whether it is stored in the storage space. If it is, then no reminder call will be generated to that telephone number, or else internet interface 24 will apprise the user that the telephone number is blocked from receiving calls. At step 154, the reminder telephone call is complete and the person receiving the call hangs up the telephone.

In accordance with another embodiment of the invention, server 20 is configured to receive a signal from the subscriber when the subscriber desires to receive more information relating to the marketing message provided to the subscriber during the telephone call. This aspect of the invention is also referred to as "bookmarking". FIG. 6(*b*) is a flow chart that illustrates how this aspect of the invention is implemented.

At step 200, a greeting is provided to the subscriber. This greeting may be the same as was provided at step 142 in the flow chart of FIG. 6(*a*). At step 202, processor 26 provides the subscriber with a book-marking instruction. This instruction may state, in one embodiment, that by pressing any button on the telephone during the course of the telephone call, additional information relating to the marketing message may be obtained.

At step 204, the subscriber generates the signal by performing in accordance with the instruction given in step 202. Thus, a button on the telephone may be pressed, expressing an interest in receiving additional information regarding the content of the marketing message. At step 206, the signal is transmitted and received by processor 26 via PSTN interface 30. Processor 26, in accordance with one embodiment, is configured so as to provide the additional information to the subscriber. At step 208, processor 26 generates the additional information and, at step 210, stores the additional data in database 22. This information may be the web address of a company that has been book-marked. Alternately, it may be additional information such as pricing, advertising content, etc.

At step 212, the additional information is transmitted to the subscriber. According to one embodiment, processor 26 is configured to receive the signal generated at step 204 and to send to the subscriber an e-mail message via internet interface 24. The e-mail message contains the additional information about the marketing message, such as product data, an order form that enables the subscriber to purchase products relating to the marketing message, related images, etc.

In another embodiment, processor 26 is configured to receive the signal generated at step 204 and to add corresponding information at the subscriber's personalized web location. For instance, according to one embodiment, the next time that the subscriber enters his or her username and password while on the website to arrive at his or her personalized web page, the personalized web page will have an additional hypertext link to another web location. The hypertext link, according to one embodiment, connects the subscriber to web sites that are related to the content of the marketing message. For instance, if the marketing message related to young men's clothing, the hypertext link could be to a web catalog that also advertises the clothing or the clothing manufacturer's home page.

In accordance with another embodiment of the invention, advertising record generator 38 of server 20 is configured to generate an advertising record to be displayed by advertising record display device 40. An advertising record permits an assessment to be made regarding the success of the marketing message delivery system. For instance, according to one embodiment, advertising record generator 38 is coupled to processor 26 in order to receive signals corresponding to the steps performed by processor 26. In this case, advertising record generator 38 is configured to tabulate the number of subscribers to the system, the number of calls that are delivered to subscribers that contains a specific marketing message, and the number of times that a subscriber expressed further interest in the product described by the marketing message by generating the appropriate signal with the telephone. Thus, an advertiser could accurately determine the success of advertising with the system of the present invention by assessing the number of people who heard the marketing message and the number of people who responded favorably to it.

In accordance with another embodiment, advertising record generator 38 is configured to generate a report that lists the data, time, and/or length of the telephone calls to the subscriber. In still another embodiment, advertising record generator 38 is configured to generate a report detailing the demographics of each person to whom the marketing message was sent, allowing an advertiser to send other promotional material to a subscriber even if the subscriber did not express interest in the product during the telephone call.

In accordance with another embodiment of the invention, server 20 is configured to interface with other websites to generate reminder telephone calls. For instance, according to one embodiment, visitors to a third party's web sites can utilize the features of server 20 of the present invention, i.e.—features of the present invention that are embedded in the third party's web site. For example, a visitor to the Disney™ web site may receive or send a telephone call, at a specified date, time and telephone number, corresponding to one of the Disney™ characters, such as a telephone call from Mickey Mouse™ to a child to convey a "Happy Birthday" wish. In another example, a visitor to the TV GUIDE™ website may learn about a TV program prior to the program being aired. By having the features of the present invention embedded on TV GUIDE™'s website, the visitor can employ the present invention's user-interface to input a telephone number, date and time so as to generate a reminder call to watch the program.

According to one embodiment, the third party web site does not have a separate database to store call data, or user demographics, etc. The third party web site has an internet interface configured to communicate with server 20 of the present invention. When a visitor to the third party web site requests a reminder call, the third party web site queries for and receives call data and the third party's internet interface sends the necessary call data, i.e.—date, time, telephone number, and the content of the message such as a birthday wish in Mickey Mouse's™ voice, to the web site of the present invention. Server 20 receives the data, and stores it in database 22 until the date and time specified, at which point it generates the telephone call.

In another embodiment, the third party web site has a hypertext link to the web site of the present invention. When a visitor to the third party web site clicks on the hypertext link, the person is sent to Mr. WakeUp's™, or a jointly developed, web site. The person then proceeds through all of the steps that an ordinary subscriber to Mr. WakeUp™ would proceed through. In one embodiment, the third party web site is configured to send and the present web site is configured to receive at least one message which can be delivered to the subscriber during the requested telephone reminder call. For instance, the third party message could be the greeting delivered at step 142 of FIG. 6(*a*), or the advertisement delivered at step 144 of FIG. 6(*a*). Alternately, the third party message could be added to fields 216 to be selected by the user.

In accordance with one embodiment of the invention, the present invention provides a unified messaging system that enables subscribers to retrieve voice and e-mail messages, along with previously described customized marketing messages, that are received by server 20. This embodiment of the invention permits a subscriber to retrieve messages that are left for the subscriber via internet or telephone. For instance, if the subscriber makes a telephone call to server 20 to retrieve his or her messages, server 20 is configured to convert all stored messages into voice messages that can be conveyed to the subscriber via PSTN interface 30. Likewise, if the subscriber retrieves his or her messages via the internet, server 20 is also configured to convert all messages to text, or to digitize the messages by creating sound files for each message, so as to be conveyed to the subscriber via internet interface 24. Both these features are described more fully below.

FIG. 6(*c*) is a flowchart that illustrates the steps for a subscriber to receive a marketing message according to one embodiment of the invention. At step 252, the subscriber makes a telephone call to server 20 via PSTN 18. At step 254, PSTN interface 30 of server 20 receives the telephone call, which advantageously but not necessarily, is made to a toll-free number. Additionally, at step 254, server 20 queries the subscriber for the subscriber's PIN number and password. The PIN number was assigned to the subscriber as previously described in step 106 of the flow chart in FIG. 3, while the password was selected by the subscriber as previously described in step 104 of the flow chart in FIG. 3.

At step 256, the subscriber inputs the PIN number and the password. At step 258, the PIN number and password are received by server 20. At step 260, processor 26 determines whether the PIN number and password are valid.

At step 262, processor 26 communicates with database 22, in order to retrieve stored messages from database 22. Database 22 has previously stored messages from other persons to the subscriber in storage spaces that correspond to the telephone number, e-mail address and PIN number that were assigned to the subscriber at steps 106 and 108 of FIG. 3. At step 264, server 20 delivers the retreived messages to the subscriber along with a marketing message.

According to one embodiment, the retrieved messages are transmitted to text-to-speech conversion module 34, which convert the text to a voice message. The voice messages are next conveyed to PSTN interface 30, whereupon they are conveyed to the subscriber via PSTN 18.

In another embodiment, the retrieved messages are transmitted to SQL database interface 28, which in turn conveys them to processor 26. The text messages and any digitized sound messages are then conveyed to internet interface 30, whereupon they are conveyed to the subscriber via internet 16.

As in previously described embodiments, the system providing unified messaging is also configured to provide customized marketing messages to subscribers. As before, a subscriber profile corresponding to a particular subscriber is matched to a marketing message that is very likely to appeal to the subscriber. When the subscriber accesses server 20 to retrieve messages that third parties have left for him or her, server 20 is configured to also convey to the subscriber the customized marketing message. The marketing message, which is matched, is one that has been pre-determined to be likely to appeal to the subscriber.

In accordance with another embodiment of the invention, server 20 is configured to receive a signal, during the retrieval of the subscriber's messages, from the telephone or computer terminal of the subscriber when the subscriber desires to receive more information relating to the marketing message provided. For instance, in one embodiment wherein the subscriber is retrieving messages via telephone, the system indicates to the subscriber that, by pressing any key on the telephone during the course of the telephone call, additional information relating to the provided marketing message may be obtained. Thus, if a key of the telephone is pressed, a signal is transmitted to server 20. Server 20 is configured so as to receive the signal and to provide the additional information to the subscriber at, for example, the subscriber's e-mail address or at the server's website next time the subscriber visits the server's website.

The additional information provided to the subscriber may comprise, for example, an image or description further describing the marketing message, or an HTML link that enables the subscriber to purchase products relating to the marketing message. In an embodiment wherein the subscriber is utilizing a computer terminal to retrieve messages, the same type of additional information may be provided to the subscriber by, for example, pressing any key of the computer terminal, or by clicking on a provided hypertext link.

Figure 7:
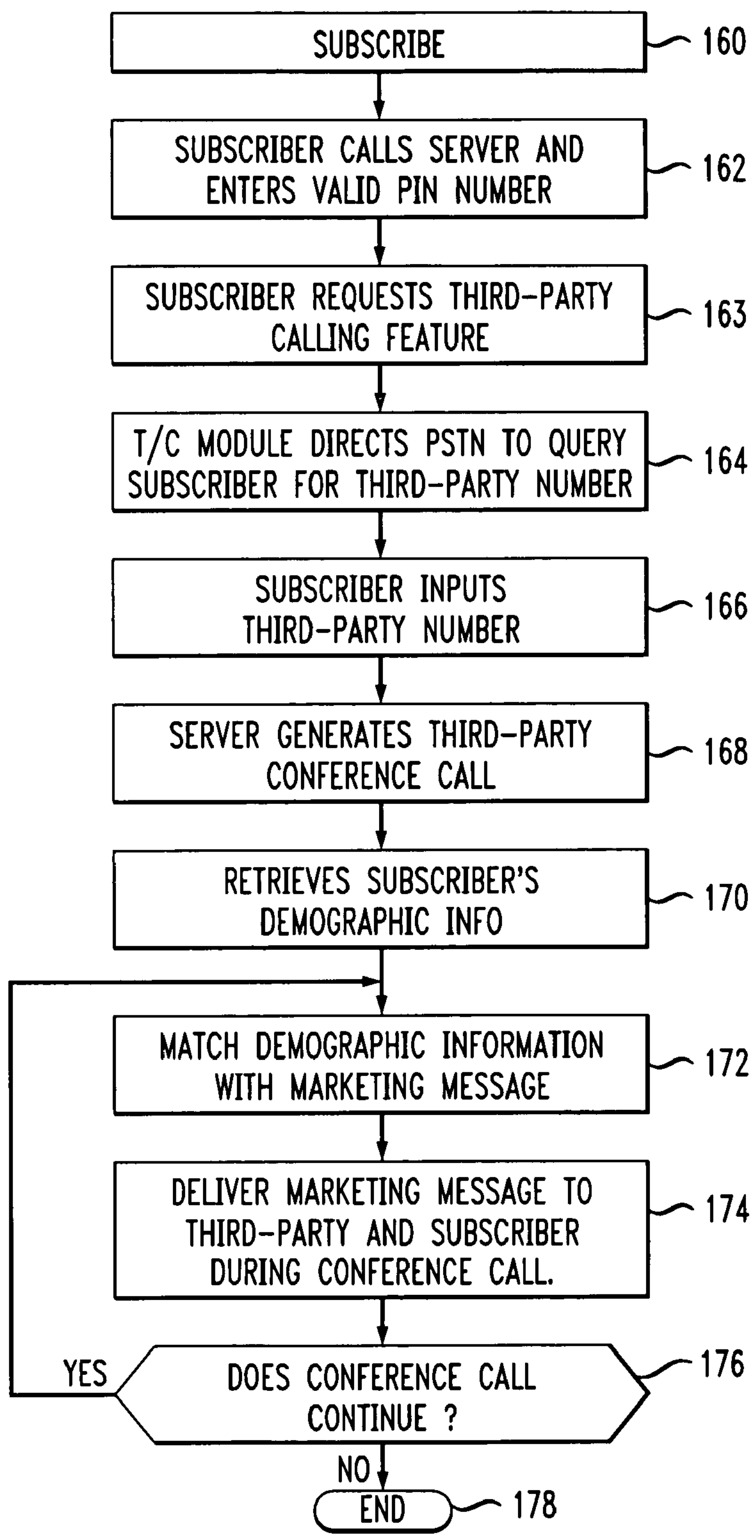
FIG. 7 is a flow chart that illustrates the steps for a system employing a telephone conferencing function, in accordance with one embodiment of the invention.

In accordance with another embodiment of the invention, marketing messages are provided to subscribers and to a third party when the subscriber calls the third party via server 20. FIG. 7 is a flow chart that illustrates the steps wherein the marketing message is delivered to both parties, in accordance with one embodiment of the invention. At step 160, a person subscribes to the present system, as previously shown and described in FIG. 3. By subscribing, the present system is able to store demographic information corresponding to the subscriber.

At step 162, the subscriber calls server 20, advantageously by dialing a telephone number that could be 800 number or assigned telephone number, and enters the valid PIN number that was assigned when subscribing. At step 163, the subscriber requests the third-party calling feature of server 20. For instance, the subscriber may press a button, or enter a series of numbers, on the telephone that correspond to the third-party calling feature.

At step 164, telephone conference module 36 directs PSTN interface 30 to query the subscriber for a third-party telephone number. This is accomplished, in accordance with one embodiment, by making a voice request for the subscriber to dial the third-party number. At step 166, the subscriber dials the third party number, which is received by PSTN interface 30 and transmitted to telephone conference module 36.

At step 168, telephone conference module 36 generates a telephone call, via PSTN interface 30, to the third-party telephone number that was inputted by the subscriber. When the third party receives the telephone call, the call is routed from the subscriber, through telephone conference module 36 via PSTN interface 30, to the third-party number, via PSTN interface 30.

At step 170, during the conversation between the subscriber and the third party, processor 26 retrieves the subscriber's demographic information from database 22. At step 172, processor 26 matches the subscriber's demographic information with a marketing message that is very likely to be of interest to the subscriber. At step 174, processor 26 delivers the marketing message via PSTN interface 30 to both the subscriber and the third-party via telephone conference module 36.

At decision step 176, the system determines whether the conference call continues, or whether the subscriber and the third party have disconnected the call. If the call does continue, then the system returns to step 172, where the subscriber's demographic information is matched to another (preferably a different) marketing message, which is delivered to the subscriber and the third party during the conference call. If the call does not continue, then the method ends at step 178.

In accordance with one embodiment of the invention, the subscriber can request additional information relating to the marketing message by pressing a button on the telephone numeric pad, as previously described.

Figure 8:
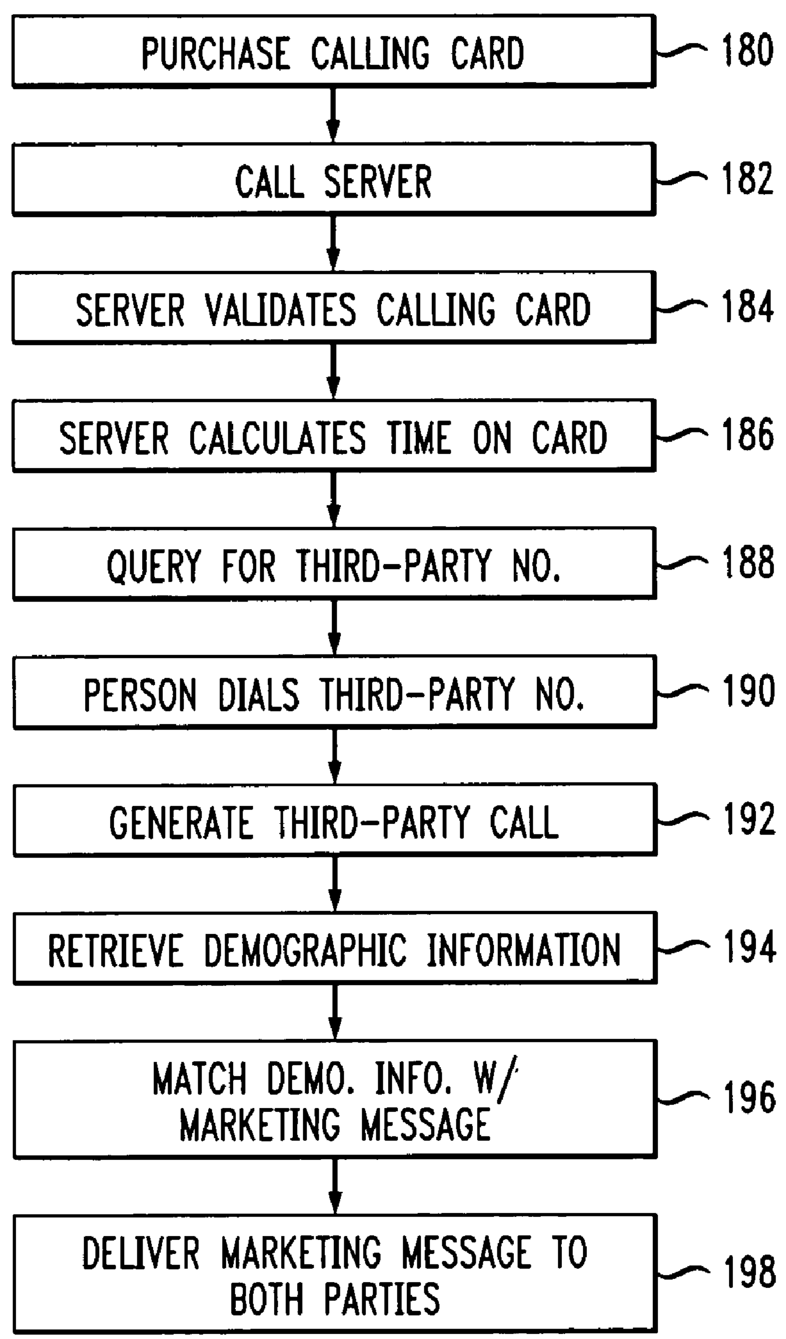
FIG. 8 is a flow chart that illustrates the steps for a system employing a calling card function, in accordance with one embodiment of the invention.

In accordance with another embodiment of the present invention, the system is configured to employ calling cards. For instance, as is well-known in the prior art, a calling card may be purchased for a set fee and have a specifiable time limit, or a number of pre-determined minute credits, associated with it. FIG. 8 is a flow chart that illustrates the steps that may be employed by the present invention employing a calling card, in accordance with one embodiment of the invention. At step 180, a person purchases a calling card having a set amount of time associated with it.

At step 182, the subscriber calls server 20, advantageously by dialing a telephone number that corresponds to the calling card function of server 20. For instance, server 20 may have numerous telephone numbers associated with it in connection with other aspects of the invention, but preferably has a specific number, printed on the calling card, that a person can call when the subscriber wishes to employ the calling card function of the present invention.

At step 184, processor 26 queries the person, via PSTN interface 30, for a calling card or PIN number. In one embodiment, the calling card has a particular number that identifies it from other calling cards, thus enabling server 20 to keep track of each calling card, and the amounts of time that are left on the card, separately. At step 186, processor 26 calculates the amount of time that remains on the calling card, and begins to subtract the length of the present telephone call from the amount of time remaining on the calling card.

At step 188, processor 26 queries the person, via PSTN interface 30, for a third-party telephone number. This is accomplished, in accordance with one embodiment, by making a voice request for the person to dial the third-party number. At step 190, the person dials the third party number, which is received by PSTN interface 30 and transmitted to processor 26.

At step 192, processor 26 generates a telephone call, via PSTN interface 30, to the third-party telephone number that was inputted. When the third party receives the telephone call, the call is routed from the original calling card owner, to processor 26 via PSTN interface 30, and to the third-party number, via PSTN interface 30.

Preferably, the person who purchases the calling card is a subscriber to the system or provides demographic information to server 20 for storage in database 22. In this embodiment, at step 194, during the conversation between the person and the third party, processor 26 retrieves the subscriber's demographic information from database 22. At step 196, processor 26 matches the subscriber's demographic information with a marketing message that is very likely to be of interest to the subscriber. At step 198, processor 26 delivers the marketing message via PSTN interface 30 to both the subscriber and the third-party.

However, it should be noted that, in accordance with one embodiment, even if the person who purchases the calling card is not a subscriber and does not provide server 20 with any demographic information, processor 26 delivers a marketing message via PSTN interface 30 to both parties to the call. Additionally, in accordance with one embodiment of the invention, the time remaining on a calling card is increased by the system after the marketing message is delivered to the parties.

Figure 9:
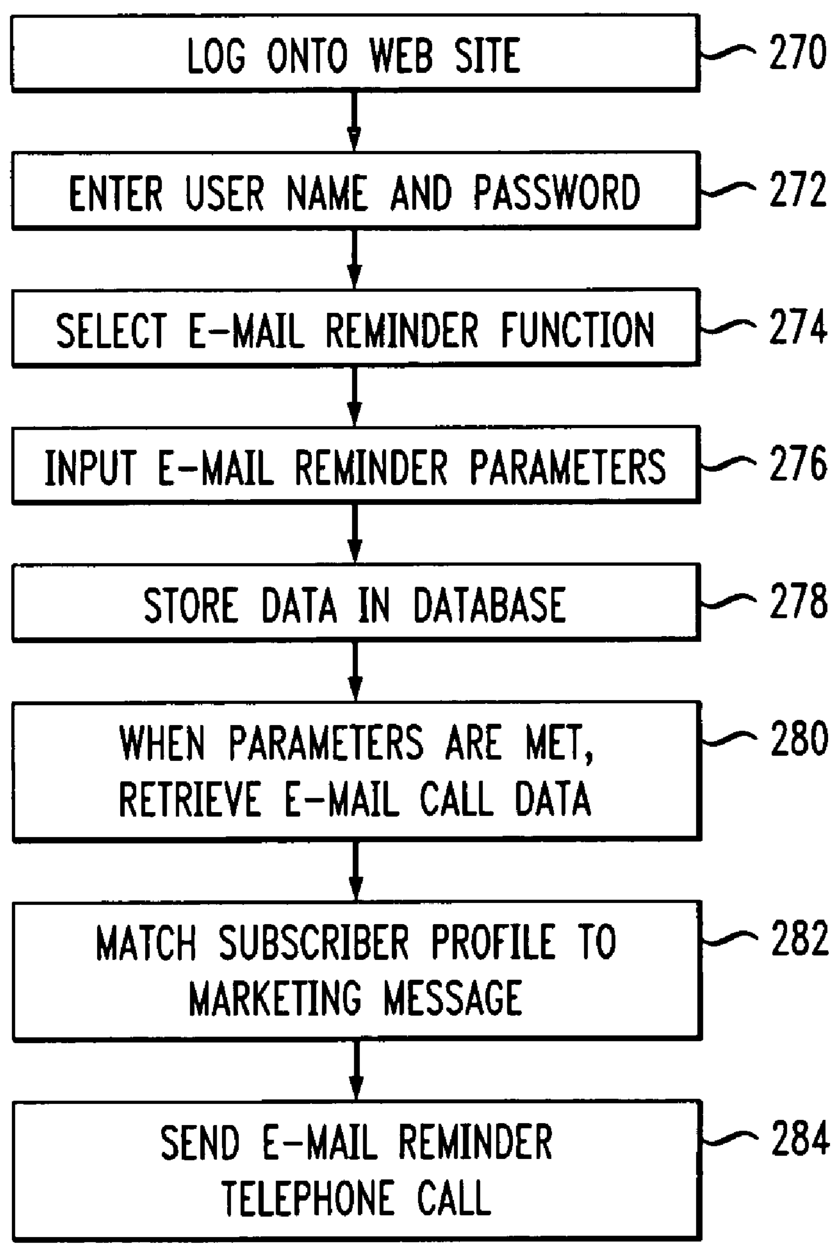
FIG. 9 is a flow chart that illustrates the steps to generate a telephone call to a subscriber when an e-mail message, or messages, is received, in accordance with one embodiment of the invention.

According to another embodiment of the invention, server 20 is configured to generate an e-mail reminder telephone call to a subscriber when an e-mail message, or messages, is received. FIG. 9 is a flow chart that illustrates how this embodiment of the invention is implemented. At step 270, a subscriber logs on to the website of the system. At step 272, the subscriber inputs his or her username and password, which directs the subscriber to his or her personalized web page. At step 274, the subscriber selects the e-mail reminder call function.

At step 276, the subscriber inputs e-mail reminder parameters. These parameters include the subscriber's own e-mail account or address that the subscriber desires to receive a reminder call about, and a telephone number at which the subscriber desires to be reached. Additionally, according to one embodiment of the invention, the parameters include information corresponding to a specific e-mail message to be received by the subscriber, such as the name of the sender or the topic of the message. According to another embodiment, the parameters include a specifiable number corresponding to the number of e-mail messages received (for instance ten messages). At step 278, the parameters are stored in database 22.

At step 280, when the reminder parameters are met, processor 26 retrieves the stored data corresponding to the subscriber, i.e.—the subscriber's telephone number and demographic information. In the first embodiment described in the previous paragraph, the parameters are met when the specific e-mail message, identified by the sender's name or the topic, is received by the server. In the other embodiment, the parameters are met when the specified number of messages, for instance ten messages, have been received by the server.

At step 282, the subscriber's demographic profile is matched to a marketing message, as previously described. At step 284, the e-mail reminder telephone call is delivered by server 20 via PSTN 18 to the subscriber at the telephone number inputted at step 276. The e-mail reminder telephone call signals to the subscriber that the specific e-mail message, or the specified number of messages, has been received by server 20. The e-mail reminder call comprises the matched marketing message. In one embodiment, the subscriber listens to the e-mail message, or some of the message (such as the sender's name or the topic of the message), converted into speech by text-to-speech conversion module 34.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

We claim:

1. A method for a communications server to deliver a marketing message, said method comprising the steps of:

receiving a telephone call from a caller at said server;

querying said caller by said server for a third-party telephone number;

receiving said third-party telephone number at said server;

establishing, by said server, a telephone conference call between said caller and a third-party at said third-party telephone number;

delivering from said server to said caller and said third-party a marketing message during said telephone conference call.

2. The method as claimed in claim 1, further comprising receiving at the server a number identifying the caller, wherein the marketing message is selected based on demographic information corresponding to the caller as identified by the received number identifying the caller.

3. A method for a communications server to deliver a marketing message, said method comprising the steps of:

receiving a telephone call at said server, from a caller having a calling card, said calling card having a predetermined number of minute credits associated with it;

receiving a calling card number of the caller at the server;

querying, by said server, said caller for a third-party telephone number;

receiving at said server said third-party telephone number;

establishing, by said server, a telephone call between said caller and a third-party at said third-party telephone number;

delivering to said caller and said third-party a marketing message during said initiated telephone call.

4. The method acording to claim 3, wherein said said server adds an additional number of minute credits to said calling card when said marketing message is delivered.

5. The method as claimed in claim 3, wherein the marketing message is selected based on demographic information corresponding to the caller as identified by the calling card number.

* * * * *